J. W. Pugh,
Furniture Caster.
Nº 78,690. Patented June 9, 1868.
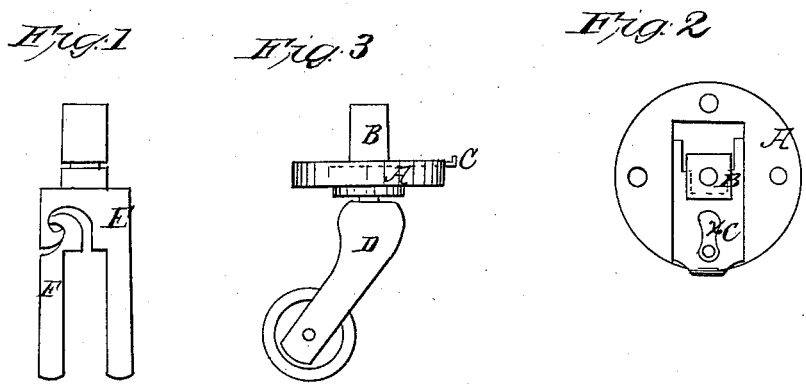
Witnesses:
Inventor:

United States Patent Office.

JOHN W. PUGH, OF GRAND RAPIDS, MICHIGAN.

Letters Patent No. 78,690, dated June 9, 1868.

IMPROVED CASTER.

The Schedule referred to in these Letters Patent and making part of the same.

TO ALL WHOM IT MAY CONCERN:

Be it known that I, JOHN W. PUGH, of Grand Rapids, in the county of Kent, and in the State of Michigan, have invented certain new and useful Improvements in Casters; and do hereby declare that the following is a full, clear, and exact description thereof, reference being had to the accompanying drawings, and the letters of reference marked thereon.

In the annexed drawings, making a part of this specification, A represents a metallic disk, to be secured to the bottom of chair-posts or the legs of a cradle or crib, by means of screws. This disk is provided with a square hole in its centre, into which the shank B of a caster may be inserted, or other device, as may be desired. The disk A is further provided with a suitable groove, in which works the slotted plate C.

C represents a slotted plate, as shown, the slot $x$ to work over a screw, which serves to fasten the disk A in place, and the larger slot made tapering, so as to embrace and serve as jaws to hold the shank B in place as long as may be desired.

B represents the upper part of the shank of a caster, and D the lower part, secured by a swivel or pin extending through the part B. The shank B has a notch or groove on three sides thereof, into which the plate or slide C catches.

E represents one part, and F the other part of a rocker-shank made in the form shown in the drawings, the part E being provided with a neck or upper shank similar to the caster-shank B.

The sides E and F are provided with screw or pin-holes, and may be secured to a rocker of any required dimensions, at a proper distance apart, and then, by means of the sliding plate C, the caster-shank may be withdrawn from, and the rocker-shank inserted and secured in the disk A, and thereby to the chair or cradle, as the case may be.

By this device the change of casters to rockers, or rockers to casters, is very simple and convenient.

All of the parts above described may be made of any material desired.

Having thus fully described my invention, what I claim as new, and desire to secure by Letter Patent, is—

The disk A, with a square opening in its centre, and provided with a space within which works a slotted metal plate, C, when used in combination with the caster, having a shank, B, with grooves on three sides, as herein set forth, all constructed and operating substantially as specified.

In testimony that I claim the foregoing, I have hereunto set my hand, this 3d day of February, 1868.

JOHN W. PUGH.

Witnesses:
B. A. HARLAN,
GEORGE H. PEW.